(12) United States Patent
Obana

(10) Patent No.: US 9,021,257 B2
(45) Date of Patent: Apr. 28, 2015

(54) SECRET INFORMATION DISTRIBUTION SYSTEM, SECRET INFORMATION DISTRIBUTION METHOD AND PROGRAM

(75) Inventor: Satoshi Obana, Tokyo (JP)

(73) Assignee: NEC Corporation, Tokyo (JP)

( * ) Notice: Subject to any disclaimer, the term of this patent is extended or adjusted under 35 U.S.C. 154(b) by 30 days.

(21) Appl. No.: 13/379,270

(22) PCT Filed: Jun. 18, 2010

(86) PCT No.: PCT/JP2010/060377
§ 371 (c)(1),
(2), (4) Date: Dec. 19, 2011

(87) PCT Pub. No.: WO2010/147215
PCT Pub. Date: Dec. 23, 2010

(65) Prior Publication Data
US 2012/0102321 A1 Apr. 26, 2012

(30) Foreign Application Priority Data
Jun. 19, 2009 (JP) ................................. 2009-146653

(51) Int. Cl.
*H04L 29/06* (2006.01)
*G06F 21/64* (2013.01)
(Continued)

(52) U.S. Cl.
CPC ................. *G06F 21/64* (2013.01); *G06F 21/00* (2013.01); *H04L 9/085* (2013.01)

(58) Field of Classification Search
USPC ....................................................... 713/164
See application file for complete search history.

(56) References Cited

U.S. PATENT DOCUMENTS

| 2002/0095581 A1* | 7/2002 | Imai et al. .................... 713/180 |
| 2009/0204802 A1 | 8/2009 | Araki et al. |
| 2010/0031128 A1 | 2/2010 | Obana |

FOREIGN PATENT DOCUMENTS

| JP | 2002-217891 A | 8/2002 |
| JP | 2004-336577 A | 11/2004 |

(Continued)

OTHER PUBLICATIONS

Adi Shamir, "How to Share a Secret", Communication of the ACM, vol. 22, No. 11, Nov. 1979, pp. 612-613.
(Continued)

*Primary Examiner* — Jacob Lipman
(74) *Attorney, Agent, or Firm* — Sughrue Mion, PLLC

(57) ABSTRACT

Secret information is encoded/distributed into distributed information according to access structure, a random number sequence corresponding to number of pieces into which the secret information is distributed is generated by randomly selecting polynomial coefficients, the coefficients are encoded/distributed into random number information according to access structure, a hash function whose hash values correspond to the random number sequence is generated, keys for which the hash function applies are selected so as to individually set data for checking whether restored secret information is being manipulated as number of pieces of check data corresponding to number of pieces into which the secret information is distributed, the distributed information is read, the secret information is restored; the random number information is read, the random number sequence is restored, the check data is read, and the restored secret information is judged as not being manipulated when the read check data satisfies the hash function.

13 Claims, 6 Drawing Sheets

(51) Int. Cl.
*G06F 21/00* (2013.01)
*H04L 9/08* (2006.01)

(56) References Cited

FOREIGN PATENT DOCUMENTS

| JP | 2008-97591 A | 4/2008 |
|---|---|---|
| JP | 2008-250931 A | 10/2008 |
| WO | 2008/001628 A1 | 1/2008 |
| WO | 2008/050544 A1 | 5/2008 |
| WO | 2008/093690 A1 | 8/2008 |
| WO | 2009/025220 A1 | 2/2009 |
| WO | 2009/075353 A1 | 6/2009 |

OTHER PUBLICATIONS

Josh Benaloh et al., "Generalized Secret Sharing and Monotone Functions", in "Advances in Cryptology—CRYPTO '88", S. Goldwasser, Ed., Lecture Notes in Computer Science 403, pp. 27-35, 1989.

Martin Tompa et al., "How to Share a Secret with Cheaters", Journal of Cryptology, vol. 1, pp. 133-138, 1988.

Wakaha Ogata et al., "Optimum Secret Sharing Scheme Secure against Cheating", SIAM Journal on Discrete Mathematics, vol. 20, No. 1, pp. 79-95, 2006.

Satoshi Obana et al., "Almost Optimum Secret Sharing Schemes Secure against Cheating for Arbitrary Secret Distribution", Advances in Cryptology—Asiacrypt 2006, Lecture Notes in Computer Science 4284, pp. 364-379, 2006.

International Search Report of PCT Application No. PCT/JP2010/060377 mailed Aug. 31, 2010.

Toshinori Araki, "Efficient (k,n) Threshold Secret Sharing Schemes Secure Against Cheating from n-1 Cheaters", Proceedings of ACISP 2007, Lecture Notes in Computer Science 4586, pp. 133-142, 2007.

Satoshi Obana, "A Generic Construction of Secret Sharing Schemes Secure against n-1 Cheaters", Symposium on Cryptography and Information in 2008, SCIS 2008 Publication, Jan. 22-25, 2008. See cited Non-Patent Document 7 as titled "General Making Method of Safe Secret Sharing Scheme against n-1 Cheaters", on p. 8, paragraph [0015] of translated Applicant's Specification for explanation of relevance.

* cited by examiner

SECRET INFORMATION DISTRIBUTION SYSTEM, SECRET INFORMATION DISTRIBUTION METHOD AND PROGRAM

TECHNICAL FIELD

The present invention relates to a secret information distribution system which safely keeps secret information in a distributed manner, and to a method as well as a program thereof.

BACKGROUND ART

When keeping secret information such as a secret key used for encryption, there are the threat of "losing and damaging" it and the threat of having it "stolen". For the former case, it is effective to generate a backup copy of the secret information. However, making the copy may increase a risk of facing the latter threat. As one of information security techniques for overcoming such issue, there is a secret distribution method depicted in Non-Patent Documents 1 and 2.

The secret distribution method is characterized to generate a plurality of pieces of distributing information acquired by distributing secret information, keep those separately, and generate it possible to uniquely restore the original secret information by gathering a preset number of pieces of distributed information among the kept distributed information. However, it is impossible to restore the secret information by gathering the distributed information other than those pieces. Hereinafter, in this Description, the number of pieces of distributed information is defined as "n" pieces, and each of n-pieces of distributed information is identified by using identifiers of 1 to n.

With the secret distribution method, a set of distributed information with which the secret information can be restored can be defined with "Γ" that is a set group of the distributed information of an access structure. The access structure "Γ" is a set group that has, as elements thereof, a set of identifiers of the minimum number of pieces of distributed information with which the secret information can be restored. With the secret distribution method having the access structure "Γ", "a set w of the distributed information is capable of restoring the secret information" means that there is "V" that satisfies a following Expression 1 for a set W of the identifiers of the distributed information corresponding to the set w. Further, the set W of the identifiers of the distributed information having a character satisfying Expression 1 is defined as an access set of "Γ".

$$V \in \Gamma \text{ and } V \subseteq W \quad \text{[Expression 1]}$$

As the secret distribution method, there is a method called a (k, n) threshold scheme. The (k, n) threshold scheme is a secret distribution method which distributes secret information into n-pieces of distributed information, and uses k (n>K) pieces of distributed information among the n-pieces of distributed information to restore the secret information. Note that "k" in the (k, n) threshold scheme corresponds to V of Expression 1 described above. An access structure "Γ" used in the (k, n) threshold scheme is defined by a set group shown in Expression 2. The access structure "Γ" has two characters, i.e., "secret information cannot be restored at all with less than k-pieces of distributed information among the n-pieces of distributed information" and "secret information can be restored uniquely from the k-pieces or more pieces of distributed information". Hereinafter, issues when restoring the secret information with the secret distribution method will be investigated.

$$\Gamma = \{V | V \subseteq \{1, 2, \ldots, n\} \text{ and number of elements of } V \text{ is } k\} \quad \text{[Expression 2]}$$

When restoring the secret information, it is necessary to collect the required number of pieces of distributed information for restoring the secret information from a plurality of recording modules which keep the individual distributed information. In this case, it is not perfectly sure that the requested side of the distributed information gives the distributed values, specifically, the distributed information kept in the recording modules, to the restorer without manipulation. That is, there may be a case where the distributed information in the recording modules is handed over to the restorer after being manipulated.

The "manipulation" herein means not only a case where an administrator to which the distributed information is given manipulates the distributed information intentionally but also a case where the distributed information is manipulated against the intention of the administrator of the distributed information. As examples of the case where the distributed information is manipulated against the intention of the administrator, there are cases where the distributed information is manipulated because of a fault generated in a device which stores the distributed information to the recording modules, cases where the distributed information is manipulated due to an operation error of the administrator, etc.

When the secret information is restored by using the manipulated distributed information, values of the restored secret information may, become different from values of the original secret information. Thus, as the secret distribution method, desired is a method which can detect with a high probability that there are manipulated values contained in the distributed information used for restoration.

Further, a means for selecting the distributed information varies depending on the operation forms. Therefore, it is desired to have a high detection rate of the manipulated values regardless of the types of probability distributions upon which the distributed information is selected.

As the techniques for overcoming such issues, the techniques depicted in Non-Patent Documents 3 to 7 are known.

Non-Patent Document 3 discloses a (k, n) threshold scheme which can detect a cheating of altering merely (k−1) pieces of distributed information by referring to (n−1) pieces of distributed information with a probability of (1−ε) regardless of the types of the probability distribution upon which the secret information is selected. With the method depicted in Non-Patent Document 3, assuming that the secret information is a set containing s-pieces of elements, the distributed information is a set containing the number of elements shown with Expression 3. Note that "n" and "k" correspond to "k" and "n" of the (k, n) threshold scheme.

$$\text{Number of elements} = ((s-1)(k-1)/\epsilon + k)^2 \quad \text{[Expression 3]}$$

Non-Patent Document 4 discloses a (k, n) threshold scheme which can detect cheating of manipulating merely (k−1) pieces of distributed information by referring to (k−1) pieces of distributed information with a probability of (1−ε) on condition that the secret information is selected based upon a uniform probability distribution. With the method depicted in Non-Patent Document 4, assuming that the secret information is a set containing s-pieces of elements, the distributed information is a set containing the number of elements shown with Expression 4. Note that "k" corresponds to "k" of the (k, n) threshold scheme.

$$\text{Number of elements} = (1 + (s-1)/\epsilon) \quad \text{[Expression 4]}$$

Non-Patent Document 5 discloses a (n, n) threshold scheme which can detect cheating of manipulating merely (k−1) pieces of distributed information by referring to (k−1) pieces of distributed information with a probability of (1ε) regardless of the types of the probability distribution upon which the secret information is selected. With the method depicted in Non-Patent Document 5, assuming that the secret information is a set containing s-pieces of elements, the distributed information is a set containing the number of elements shown with Expression 5. The (n, n) threshold scheme is a secret distribution method which distributes secret information into n-pieces of distributed information, and uses the n-pieces of distributed information to restore the secret information. Note that "n" of the (n, n) threshold scheme of the secret distribution method corresponds to "k" mentioned above.

$$\text{Number of elements} = s/\epsilon^2 \qquad \text{[Expression 5]}$$

Non-Patent Document 6 discloses a (k, n) threshold scheme which can detect cheating of manipulating merely (k−1) pieces of distributed information by referring to (n−1) pieces of distributed information with a probability of (1ε) regardless of the types of the probability distribution upon which the secret information is selected. With the method depicted in Non-Patent Document 6, when the secret information is a set containing s-pieces of elements and s satisfies s≤1/ε, the distributed information is a set containing the number of elements shown with Expression 6. Note that "k" corresponds to "k" of the (k, n) threshold scheme.

$$\text{Number of elements} = s^2/\epsilon \qquad \text{[Expression 6]}$$

Non-Patent Document 7 discloses a (k, n) threshold scheme which can detect cheating of manipulating merely (k−1) pieces of distributed information by referring to (n−1) pieces of distributed information with a probability of (1ε) regardless of the types of the probability distribution upon which the secret information is selected. With the method depicted in Non-Patent Document 7, when the secret information is a set containing s-pieces of elements and s satisfies s≤1/ε, the distributed information is a set containing the number of elements shown with Expression 7. Note that "k" corresponds to "k" of the (k, n) threshold scheme.

$$\text{Number of elements} = s \times (\log(s))^{k+1}/\epsilon \qquad \text{[Expression 7]}$$

Patent Document 1 related to the secret distribution method as described above discloses a structure which allocates distributed information generated by a (k+t, n+t) method for each of n-pieces of administrator devices. Patent Document 2 discloses a structure which acquires a plurality of optimum allocated maps for a general access structure by integer programming.

Patent Document 3 discloses a data protection method and the like which store generated distributed information by further encrypting it with a public key, restore the distributed information with a secret key, and then restore secret information that is the original data. Patent Document 4 discloses a distributed information restoring system and the like with which a distributed information managing device conceals and saves distributed information with random numbers according to a request from an information utilization device that saves the random numbers.

Patent Document 1: Japanese Unexamined Patent Publication 2002-217891
Patent Document 2: Japanese Unexamined Patent Publication 2004-336577
Patent Document 3: Japanese Unexamined Patent Publication 2008-097591
Patent Document 4: Japanese Unexamined Patent Publication 2008-250931

Non-Patent Document 1: Adi Shamir, "How to share a secret", Comm. ACM, 22(11), 612-613 (1979)
Non-Patent Document 2: J. Benaloh and J. Leichter, Generalized secret sharing and monotone functions, in "Advances in Cryptology - - - CRYPTO '88", S. Goldwasser, ed., Lecture Notes in Computer Science 403, pages 27-35, 1989
Non-Patent Document 3: Martin Tompa, Heather Woll, "How to Share a Secret with Cheaters", Journal of Cryptology, vol. 1, pages 133-138, 1988
Non-Patent Document 4: Wakaha Ogata, Kaoru Kurosawa, Douglas R. Stinson, "Optimum Secret Sharing Scheme Secure Against Cheating", SIAM Journal on Discrete Mathematics, vol. 20, no 1, pages 79-95, 2006
Non-Patent Document 5: Satoshi Obana and Toshinori Araki, "Almost Optimum Secret Sharing Schemes Secure Against Cheating for Arbitrary Secret Distribution", Advances in Cryptology - - - Asiacrypt 2006, Lecture Notes in Computer Science 4284, pp. 364-379, 2006
Non-Patent Document 6: Toshinori Araki, "Efficient (k, n) Threshold Secret Sharing Schemes Secure Agianst Cheating from n−1 Cheaters", Proceedings of ACISP 2007, Lecture Notes in Computer Science 4586, pp. 133-142, 2007
Non-Patent Document 7: Satoshi Obana, "General Making Method of Safe Secret Sharing Scheme against n−1 Cheaters", Symposium on Cryptography and Information in 2008, SCIS 2008 Publication, 2008

There are following issues generated with Non-Patent Documents 1 to 7 described above. That is, there may be a case where several people managing distributed information conspire together to improve secret information that is to be restored by a single restorer. Specifically, secret information is distributed into n-pieces of distributed information by making (k−1)-degree polynomial, those pieces of distributed information are managed by being distributed to two or more administrators to be managed, and the distributed information is collected from k−1 people to restore the secret information. To improve the secret information restored by a single restorer (referred to as a proper user hereinafter), the conspirers partially restore the (k−1)-degree polynomial based on the distributed information held by themselves, manipulate the distributed information held by themselves, rewrite the manipulated distributed information to a (k−1)-degree polynomial containing the distributed information held by the proper user from the original (k−1)-degree polynomial, and give the manipulated distributed information to the proper user.

When the proper user restores the secret information by having the distributed information included in the distributed information held by the user oneself, the secret information different from the original secret information is restored since the (k−1)-degree polynomial used for restoration is rewritten.

However, there is no means for detecting whether or not the restored secret information is being manipulated taken in the techniques of Non-Patent Documents 1 to 7 described above, so that the restore (proper user) who does not intend cheating cannot restore the secret information.

Further, there is also no technical means taken in the techniques disclosed in Patent Document 1 to 4 for overcoming the issues generated in Non-Patent Documents 1 to 7.

It is an object of the present invention to provide a secret information distribution system, a secret information distributing method and a program thereof for detecting whether or not the restored secret information is being manipulated when those who hold distributed secret information conspire to manipulate the distributed information.

DISCLOSURE OF THE INVENTION

In order to achieve the foregoing object, the secret information distribution system according to the present invention is a secret information distribution system which manages secret information by distributing the secret information into two or more pieces of distributed information and restores the secret information by integrating the distributed information, and the system is characterized to include a distributed information generating device, a recording device, and a distributed information restoring device, wherein:

the distributed information generating device comprises a secret information distributing unit which encodes and distributes secret information into two or more pieces of distributed information according to an access structure, a random number information distributing unit which generates a sequence of random numbers corresponding to number of pieces into which the secret information is distributed by randomly selecting all coefficients of a polynomial, and encodes and distributes all the coefficients into two or more pieces of random number distribution information according to the access structure, and a check data generating unit which generates a hash function whose hash values correspond to the random number sequence by taking the secret information and the random number distribution information as input, and selects keys for which the hash function applies so as to individually set data for checking whether or not restored secret information is being manipulated as number of pieces of check data corresponding to the number of pieces into which the secret information is distributed, the distributed information generating device outputs the distributed information, the random number information, and the check data as a set of information;

number of the recording devices corresponding to the number of pieces into which the secret information is distributed are provided, and each of the recording devices records the distributed information, the random number information, and the check data as a set of information; and the distributed information restoring device includes a secret information restoring unit which reads out the distributed information from the recording devices, and restores the secret information according to the access structure, a random number information restoring unit which reads out the random number information from the recording devices, and restores the random number sequence according to the access structure, and a cheating detecting unit which reads out the check data from the recording devices, and judges that the restored secret information is not being manipulated when the read out check data satisfies the hash function.

While the present invention is built above as the secret information distribution system as a device, the present invention is not limited only to such case. The present invention may be built as a method or a program as software.

When the present invention is built as a method, the secret information distribution method according to the present invention is a secret information distribution method which manages secret information by distributing the secret information into two or more pieces of distributed information and restores the secret information by integrating the distributed information, and the method is characterized to include:

encoding and distributing secret information into two or more pieces of distributed information according to an access structure;

generating a sequence of random numbers corresponding to number of pieces into which the secret information is distributed by randomly selecting all coefficients of a polynomial, and encoding and distributing all the coefficients into two or more pieces of random number distribution information according to the access structure;

generating a hash function whose hash values correspond to the random number sequence by taking the secret information and the random number distribution information as input, and selecting keys for which the hash function applies so as to individually set data for checking whether or not restored secret information is being manipulated as number of pieces of check data corresponding to the number of pieces into which the secret information is distributed;

outputting the distributed information, the random number information, and the check data as a set of information;

reading out the distributed information, and restoring the secret information according to the access structure;

reading out the random number information, and restoring the random number sequence according to the access structure; and reading out the check data, and judging that the restored secret information is not being manipulated when the read out check data satisfies the hash function.

When the present invention is built as a program, the distributed information generating program according to the present invention is a program for controlling generation of distributed information in a secret information distribution system which manages secret information by distributing the secret information into two or more pieces of distributed information and restores the secret information by integrating the distributed information, and the program is characterized to cause a computer to execute:

a function of encoding and distributing secret information into two or more pieces of distributed information according to an access structure;

a function of generating a sequence of random numbers corresponding to number of pieces into which the secret information is distributed by randomly selecting all coefficients of a polynomial, and encoding and distributing all the coefficients into two or more pieces of random number distribution information according to the access structure; and a function of generating a hash function whose hash values correspond to the random number sequence by taking the secret information and the random number distribution information as input, and selecting keys for which the hash function applies so as to individually set data for checking whether or not restored secret information is being manipulated as number of pieces of check data corresponding to the number of pieces into which the secret information is distributed.

Further, the restoring program according to the present invention is a program for controlling restoration of secret information used in a secret information distribution system which manages secret information by distributing the secret information into two or more pieces of distributed information and restores the secret information by integrating the distributed information, and the program is characterized to cause a computer to execute: by taking distributed information acquired by encoding and distributing secret information according to an access structure, random number information acquired by generating a sequence of random numbers corresponding to number of pieces into which the secret information is distributed by randomly selecting all of coefficients of a polynomial and encoding and distributing all the coefficients according to the access structure, and check data set individually as number of pieces of check data corresponding to the number of pieces into which the secret information is distributed by generating a hash function whose hash values correspond to the random number sequence by taking the secret information and the random number distribution information as input, and selecting keys for which the hash function applies, as a set of information outputted by a distributed information generating device of the secret information distribution system, a function of acquiring the distributed information and restoring the secret information according to the access structure;

a function of reading out the random number information, and restoring the random number sequence according to the access structure; and a function of reading out the check data, and judging that the restored secret information is not being manipulated when the read out check data satisfies the hash function.

As described above, the present invention is designed to: generate a sequence of random numbers corresponding to the number into which the secret information is distributed by randomly selecting all the coefficients of the polynomial; encode and distribute all the coefficients into two or more pieces of random number distribution information according to an access structure; generate a hash function whose hash values correspond to the random number sequence by taking the secret information and the random number distribution information as the input; and select the keys for which the hash function applies so as to individually set data for checking whether or not the restored secret information is being manipulated as number of pieces of check data corresponding to the number of pieces into which the secret information is distributed; read out the random number information when restoring; restore the random number sequence according to the access structure; read out the check data; and judge that the restored secret information is not being manipulated when the read out check data satisfies the hash function. Therefore, it is possible to detect whether or not the restored secret information is being manipulated.

BEST MODES FOR CARRYING OUT THE INVENTION

Hereinafter, exemplary embodiments of the invention will be described in details based on the drawings.

Figure 1:
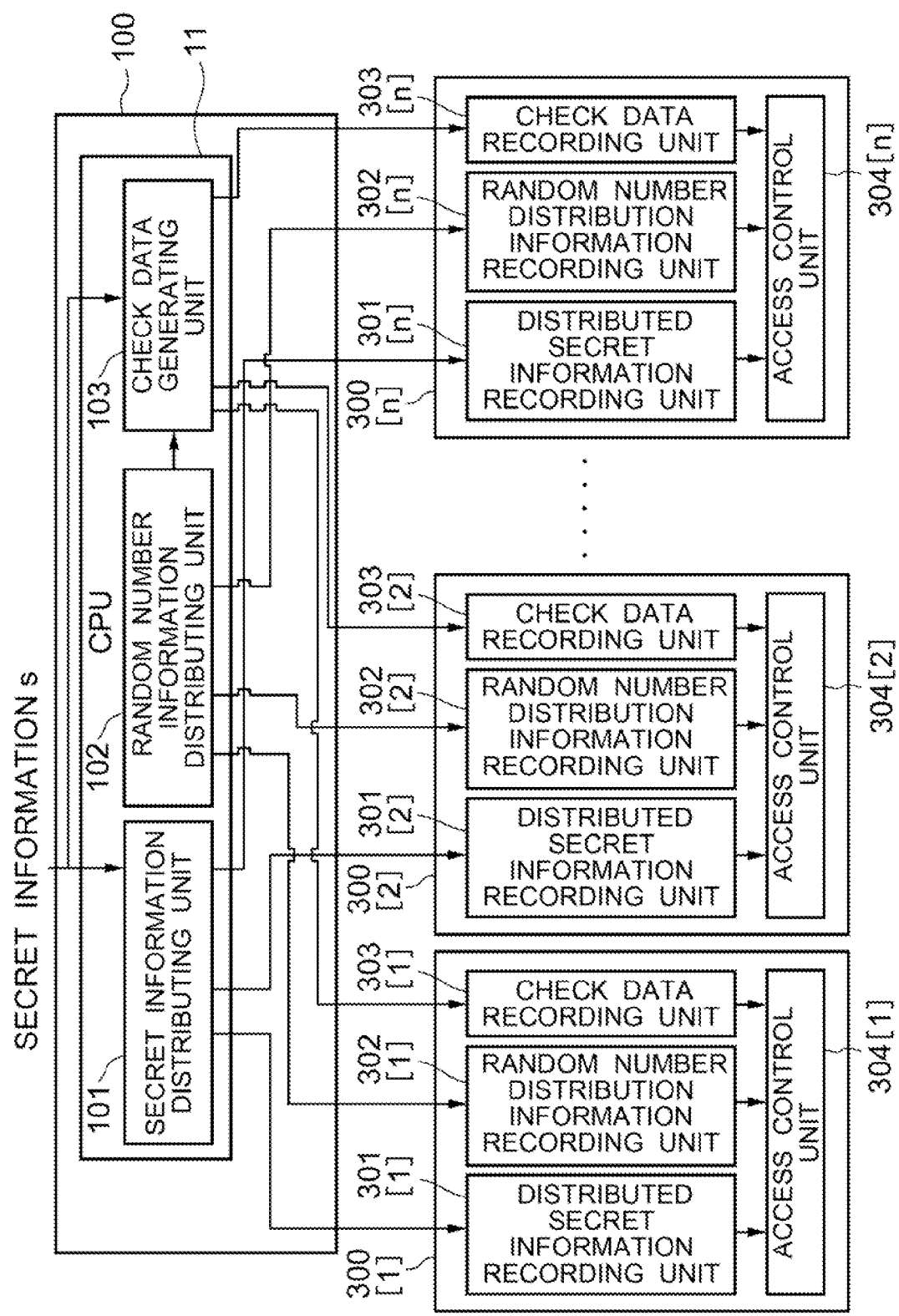
FIG. 1 is an explanatory illustration showing the structure of a distributed information generating device used in a secret information distribution system according to an exemplary embodiment of the invention.
Figure 2:
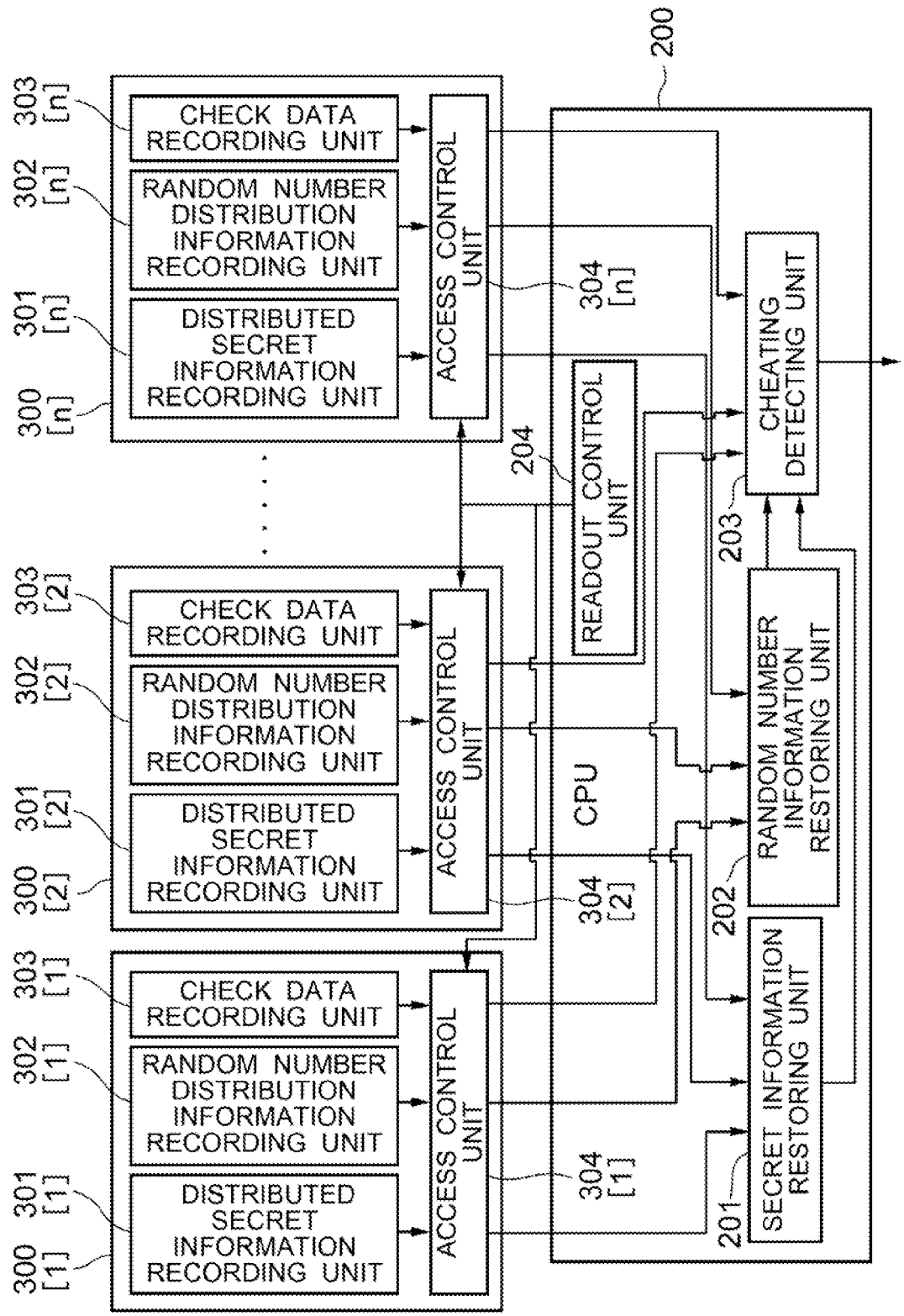
FIG. 2 is an explanatory illustration showing the structure of a distributed information restoring device used in the secret information distribution system according to the exemplary embodiment of the invention.

A secret information distribution system according to an exemplary embodiment of the invention includes a distributed information generating device 100 shown in FIG. 1, a distributed information restoring device shown in FIG. 2, and recording devices 300 shown in FIG. 1 and FIG. 2.

Next, detailed structures of the distributed information generating device 100 shown in FIG. 1, the distributed information restoring device 200 shown in FIG. 2, and the recording device 300 will be described.

While a case of employing a secret information distribution method by a (k, n) threshold scheme disclosed in Non-Patent Document 1 is used for explanations provided hereinafter, the secret information distribution method is not limited only to the (k, n) threshold scheme of Non-Patent Document 1. As the secret information distribution method, those disclosed in Non-Patent Document 2 to 7 may be used. Further, a secret information distribution method by a (n, n) threshold scheme, for example, may be used. That is, any kinds may be employed, as long as it is a secret information distribution method which encodes and distributes the secret information into two or more pieces of distributed information. Signs "+", "−", "*", "^" showing operators are used as sum, difference, product, and power operators, respectively. Particularly, in sections other than expressions, "A to the power of B" is expressed as "A^B".

As shown in FIG. 1, the distributed information generating device 100 used in the secret information distribution system according to the exemplary embodiment includes a secret information distributing unit 101, a random number information distributing unit 102, and a check data generating unit 103.

The secret information distributing unit 101 encodes and distributes inputted secret information s into two or more pieces (n-pieces) of distributed information vs[1], vs[2], - - - vs[n] (vs[i]∈VS[i]) according to an access structure.

The access structure means a set group containing a set of minimum distributed information that can restore secret information by a secret distribution method as an element. Further, provided that the access structure is "Γ", a set W of k satisfying k∈Γ and k⊆W is defined as an access set of the access structure "Γ". Note that the "k" corresponds to "k" of a case where the secret information s can be restored by accumulating k-pieces of distributed information when the secret information s is distributed into n-pieces of distributed information.

Further, a secret information data set S is defined to indicate a set of secret information s as a target of keeping. The distributed secret information data set VS[i] indicates a set of secret distributed information vs[1], vs[2], - - - vs[n] (vs[i] ∈VS[i]) as the distributed and encoded data of the secret information s∈S. VS[i] means an i-th secret distributed information set. Further, data having one of elements of the distributed secret information data set VS[i] are expressed as vs[1], vs[2], - - - vs[k], where k≤i.

The random number information distributing unit 102 generates a sequence of random numbers corresponding to the number into which the secret information is distributed by selecting all the coefficients of a polynomial randomly, and encodes and distributes all the coefficients into two or more pieces (n-pieces) of random number distribution information vr[1], vr[2], - - - vr[n] according to an access structure.

A random number information data set R is defined to indicate a set of random number information r as a target of keeping. The random number information data set VR[i] is defined to indicate a set of random number distribution information vr [1], vr[2], - - - vr[n] (vr[i]∈VR[i]) as the distributed and encoded data of the random numbers r∈R (all the coefficients of polynomial). The random number distribution information data set VR[i] indicates an i-th distributed information vr[i] set. Further, data having one of elements of the random number distribution information data set VR[i] are expressed as vr[1], vr[2], - - - vr[k], where k≤i.

Described is a structure with which the random number information distributing unit 102 encodes and distributes to two or more pieces (n-pieces) of random number distribution information vr[1], vr[2], - - - vr[n]. The random number information distributing unit 102 generates a polynomial shown in Expression 8, for example.

$$f(x)=r_0+r_1x+r_2x^2+\ldots r_{k-1}x^{k-1} \qquad \text{[Expression 8]}$$

All the coefficients (k-pieces) of the polynomial, i.e., $r_0$, $r_1$, $r_2$, - - - $r_{k-1}$, are selected randomly, and a sequence of n-pieces of random numbers (polynomial) shown in Expression 9 is generated.

$$f(1), f(2), f(3) \ldots f(n) \qquad \text{[Expression 9]}$$

Here, it is proved that arbitrary k-pieces of values are independent when the sequence of n-pieces random numbers is generated.

Then, the random number information distributing unit 102 encodes and distributes $r_0$, $r_1$, $r_2$, - - - $r_{k-1}$ according to the access structure disclosed in Non-Patent Document 1 and the like to encode and distribute those to the two or more pieces (n-pieces) of random number distribution information vr[1], vr[2], - - - vr[n]. The structure for encoding and distributing done by the random number information distributing unit 102 does not contain the feature of the present invention, so that details thereof are omitted. The present invention is characterized to generate the random number sequence in the number corresponding to the number into which the secret information is distributed by randomly selecting all the coefficients of the polynomial, and encode and distribute to the two or more pieces (n-pieces) of random number distribution information vr[1], vr[2], - - - vr[n].

The check data generating unit 103 generates a hash function whose hash values correspond to the random number sequence, and selects a key with which the hash function applies to individually set data for checking whether or not the restored secret information is being manipulated as check data e[1], e[2], - - - e[n] (e[i]∈E) in the number of pieces corresponding to the number into which the secret information is distributed.

Note here that the check data set E is defined to indicate a set of check data generated by corresponding to secret information s∈S and random numbers r∈R.

Next, the structure of the check data generating unit 103 will be described in a more specific manner.

In a case where the random number sequence generated by the random number information generating unit 102 is a function shown in Expression 10 where r[0], r[1], r[2], - - - r[k−1] are coefficients of the polynomial and i=1 to n (n is the number corresponding to the number into which the secret information is distributed), the check data generating unit 103 selects keys i for which a hash function h applies as a function satisfying the hash function h whose hash values correspond to f(r, i) mentioned above shown in Expression 11 to individually set the data for checking whether or not the restored secret information is being manipulated as check data e[1], e[2], - - - e[n] (e[i]∈E) in the number of pieces corresponding to the number into which the secret information is distributed. Each of the check data e[i]∈E is the data satisfying the hash function.

$$f(r,i)=r[0]+r[1]\times i+r[2]\times i^2+\ldots+r[k-1]\times i^{k-1} \qquad \text{[Expression 10]}$$

$$h((e[0],e[1]),s)=f(r,i) \qquad \text{[Expression 11]}$$

The expression shown in Expression 11 can be expressed as an expression shown in Expression 12.

$$h((e[0],e[1]),s)=e[0]+e[1]\times s[1]+e[1]^2\times s[2]+\ldots+e[1]^N\times s[N] \qquad \text{[Expression 12]}$$

The hash function h is a hash function constituted with a linear function, and it is written in a general expression. However, it can be expressed as in Expression 13.

$$h_{ei}(s)=e_{i[0]}+s\times e_{i[1]}=f(i) \qquad \text{[Expression 13]}$$

In Expression 13, s is secret information to be inputted, and f(i) in the right side is the inputted random distributed information (random number sequence).

In the expression above, the right side f(i) is fixed, so that it is possible to individually set the check data e[1], e[2], - - - e[n] (e[i]∈E) by selecting elements $e_{i[0]}$ in the left side randomly. Therefore, an expression shown in Expression 14 can be acquired when it is expressed as a hash function corresponding to secret distributed information vs1, vs2, - - - vsn acquired by distributing secret information into two or more pieces.

$$h(s_1, s_2, \ldots s_n) = e_{i[0]} + \sum_{j=1}^{N} e_{i[1]}^j \times s_j \qquad \text{[Expression 14]}$$

The hash values of the hash function are more than enough in terms of the security, and it is astronomically impossible for others to decipher the key i kept by a given keeper. Further, the hash function h is the so-called hash function with a key, so that the hash values cannot be deciphered unless the key i is deciphered.

The hash values described above are in a size more than enough in terms of the security. However, the security can be maintained with the hash values of smaller size, so that the size of the hash values can be made smaller by using the probability theory. This will be described in a more specific manner.

The properties required for the hash values are as follows. That is, even when a hash value a for the secret information s is deciphered, it is required that a hash value a for secret information s' (manipulated, for example) which is different from the secret information s is not deciphered. This content corresponds to a probability when expressed with an expression based on a probability theory, and it can be expressed with an expression shown in Expression 15.

$$\frac{|\{e \mid h(e, s) = a, h(e, s') = a'\}|}{|\{e \mid h(e, s) = a\}|} \leq \varepsilon \qquad \text{[Expression 15]}$$

A denominator shown in Expression 16 out of the expression shown in Expression 15 shows a candidate of the key held by a given keeper in a case where a plurality of keepers conspire to manipulate the secret information s that is restored by the given keeper. In the above expression, it is defined that e takes an extremely small value.

$$|\{e|h(e,s)=a\}| \quad \text{[Expression 16]}$$

Therefore, the expression shown in Expression 14 can be expressed as an expression shown in Expression 17 by using an expression of the probability theory.

$$P_r[f(r,i[1])=a[1],f(r,i[2])=a[2],\ldots,f(r,i[k-1])=a[k-1],]=1/|A|^{k-1} \quad \text{[Expression 17]}$$

Therefore, when individually setting the check data e[1], e[2], - - - e[n] (e[i]∈E) in the number of pieces corresponding to the number into which the secret information is distributed, the check data generating unit 103 may also set the check data individually by taking the expressions shown in Expression 15 and Expression 17 into consideration.

Figure 5:
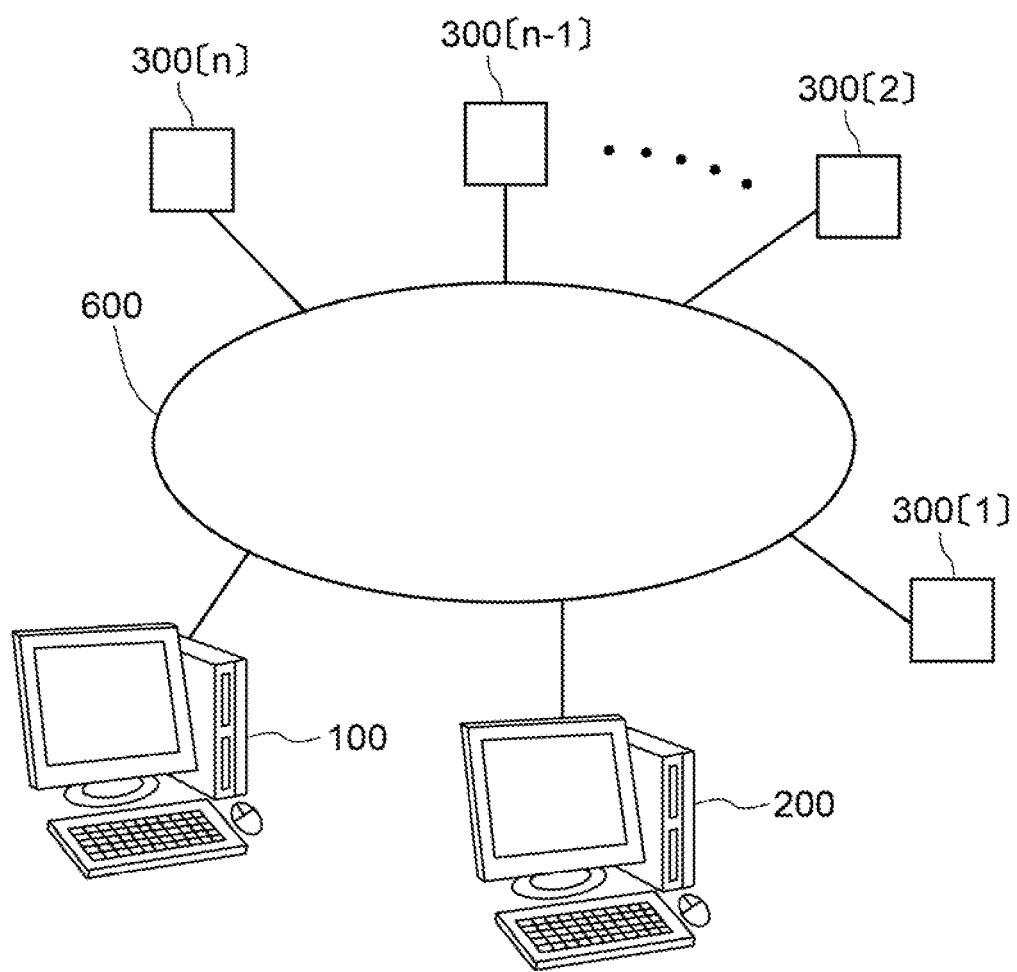
FIG. 5 is an illustration showing a layout relation of the distributed information generating device, recording devices, and the distributed information restoring device in the secret information distribution system according to the exemplary embodiment of the invention.

Next, the recording device 300 will be described. As shown in FIG. 1 and FIG. 2, there are the number of the recording devices 300 being provided to correspond to the number (n-pieces) into which the secret information s is distributed as the secret distributed information. That is, there are n-pieces of recording devices 300[1] to 300[n] being provided. Further, as shown in FIG. 5, each of the recording devices 300 is individually placed and linked between the distributed information generating device 100 and the distributed information restoring device 200 via the Internet or a communication net 600 such as LAN to exchange information. The recording devices 300[1] to 300[n] divide the recording regions to have divided secret information recording units 301[1] to 301[n], random number distribution information recording units 302[1] to 302[n], and the check data recording units 303[1] to [n].

The distributed secret information recording units 301[1] to 301[n] within the recording devices 300[1] to 300[n] record secret distributed information vs[1] to vs[n] as the base of the distributed secret information data set VS outputted from the secret information distributing unit 101 of the distributed information generating device 100.

The random number distribution information recording units 302[1] to 302[n] within the recording devices 300[1] to 300[n] record random number distribution information vr[1] to vr[n] as the base of the random number distribution information data set VR outputted from the random number distributing unit 102 of the distributed information generating device 100.

The check data recording units 303[1] to 303[n] within the recording devices 300[1] to 300[n] record check data e[1] to e[n] as the base of the check data set E outputted from the check data generating unit 103 of the distributed information generating device 100.

Further, the recording devices 300[1] to 300[n] include access control units 304[1] to 304[n], respectively, for controlling data read out from the distributed information device 200 based on a signal from a readout control unit 204 of the distributed information restoring device 200.

Next, the distributed information restoring device 200 used in the secret information distribution system according to the exemplary embodiment will be described by referring to FIG. 2.

As shown in FIG. 2, the restoring device 200 includes a secret information restoring unit 201, a random number information restoring unit 202, a cheating detecting unit 203, and the readout control unit 204.

The secret information restoring unit 201 reads out the distributed information vs[1], vs[2] to vs[k] or vs[n] from the recording devices 300[1] to 300[k] or 300[n] shown in FIG. 1 and FIG. 2, and restores the secret information s according to the access structure. As the structure for the secret information restoring unit 201 to restore the secret information s, the structures disclosed in Non-Patent Documents 1 to 7 can be employed. There is no feature of this exemplary embodiment in those structures, so that the details thereof are not described herein.

The random number information restoring unit 202 reads out the random number information vr[1], vr[2] to vr[k] or vr[n] from the recording devices 300[1] to 300[k] or 300[n], and restores the random number sequence according to the access structure.

The random number sequence is an expression corresponding to Expression 10, and it is expressed as an expression shown in Expression 18.

$$f(r,i)=r[0]+r[1]\times i+r[2]\times i^2+\ldots+r[k-1]\times i^{k-1} \quad \text{[Expression 18]}$$

The cheating detecting unit 203 reads out the check data e[1], e[2] to e[k] or e[n] from the recording units 300[1] to 300[k] or 300[n], and judges that the restored secret information s is not being manipulated when the read out check data satisfies the hash function.

The hash function is an expression corresponding to Expression 11, and it is expressed as an expression shown in Expression 19.

$$h((e[0],e[1]),s)=f(r,i) \quad \text{[Expression 19]}$$

The distributed information generating device 100 and the restoring device 200 shown in FIG. 1 and FIG. 2 can be built not only as the hardware structure by a semiconductor integrated circuit such as LSI (Large Scale Integration), DSP (Digital Signal Processor), or the like constituted with a logic circuit and the like but also as software through executing a program by a CPU. As a device for executing a program for building the distributed information generating device 100 and the restoring device 200 on software, considered is a structure shown in FIG. 6.

Figure 6:
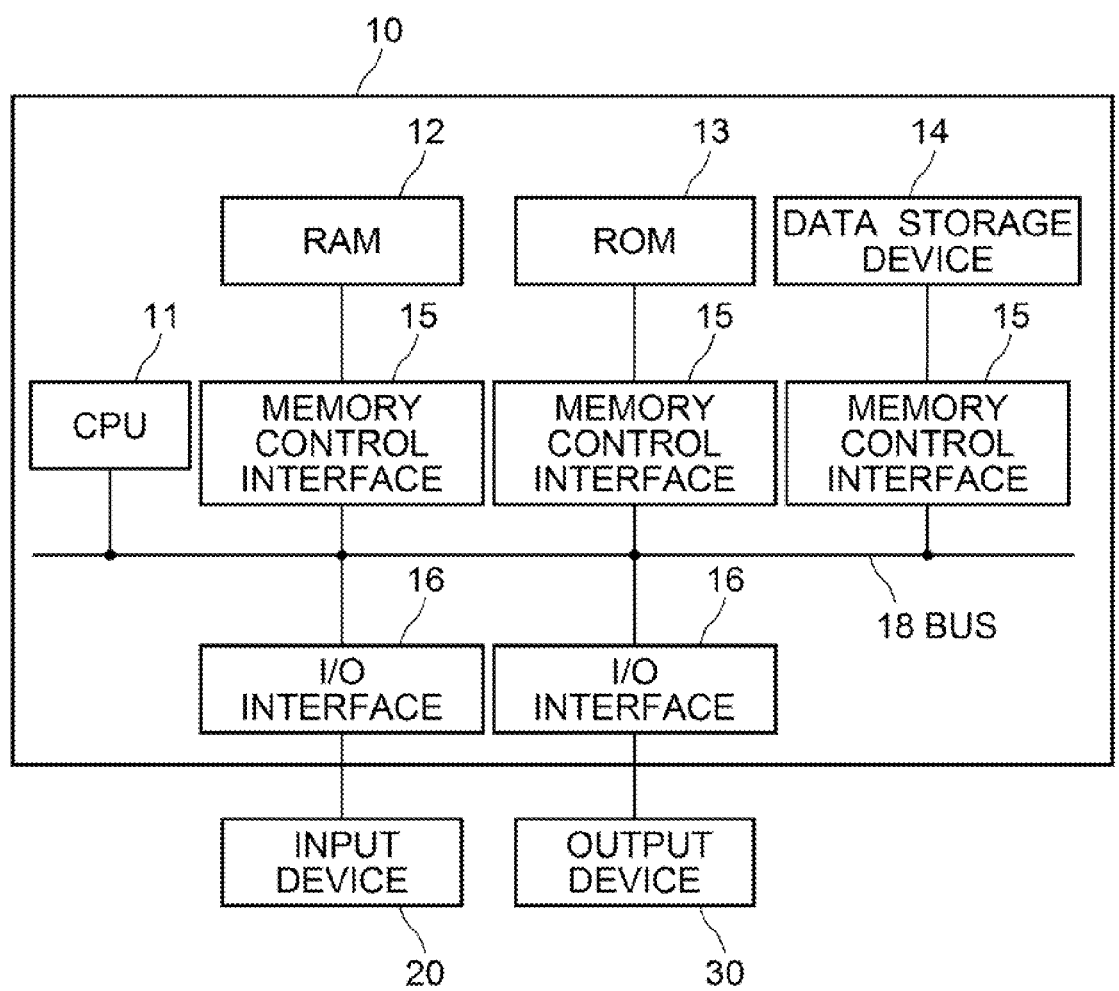
FIG. 6 is an explanatory illustration showing the structure of a computer device which constitutes the distributed information generating device and the distributed information restoring device used in the secret information distribution system according to the exemplary embodiment of the invention on software.

As shown in FIG. 6, the device is implemented by a computer which includes: a processing device 10 having a built-in CPU 11; an input device 20 for inputting a command, information, and the like to the processing device 10; and an output device 30 for monitoring a processing result of the processing device 10.

The processing device 10 shown in FIG. 6 is structured by including: the CPU 11; a main recording unit 12 which temporarily records information required for the processing of the CPU 11; a recording medium 13 on which a program for causing the CPU 11 to execute the processing as the distributed information generating device 100 or the distributed information restoring device 200; a data storage unit 14 to which the secret information and the data of the access structure are stored; a memory control interface unit 15 which controls data transfer among the main recording unit 12, the recording medium 13, and the data storage unit 14; and an I/O interface unit 16 as an interface unit between the input device 20 and the output device 30. Those are connected via a bus 18.

The data storage unit 14 does not need to be built inside the processing device 10 but may be provided independently from the processing device 10. Further, the data storage unit 14 may be used as the recording device 300 which includes the distributed secret information recording device 301, the random number distribution information recording device 302, and the distributed check data recording device 303.

The processing device 10 implements the functions as the distributed information generating device 100 or the distributed information restoring device 200 according to a program recorded on the recording medium 13. The recording medium 13 may be a magnetic disk, a semiconductor memory, an optical disk, or other types of recording medium.

Next, actions of the secret information distribution system according to the exemplary embodiment will be described by referring to FIG. 3 and FIG. 4.

Figure 3:
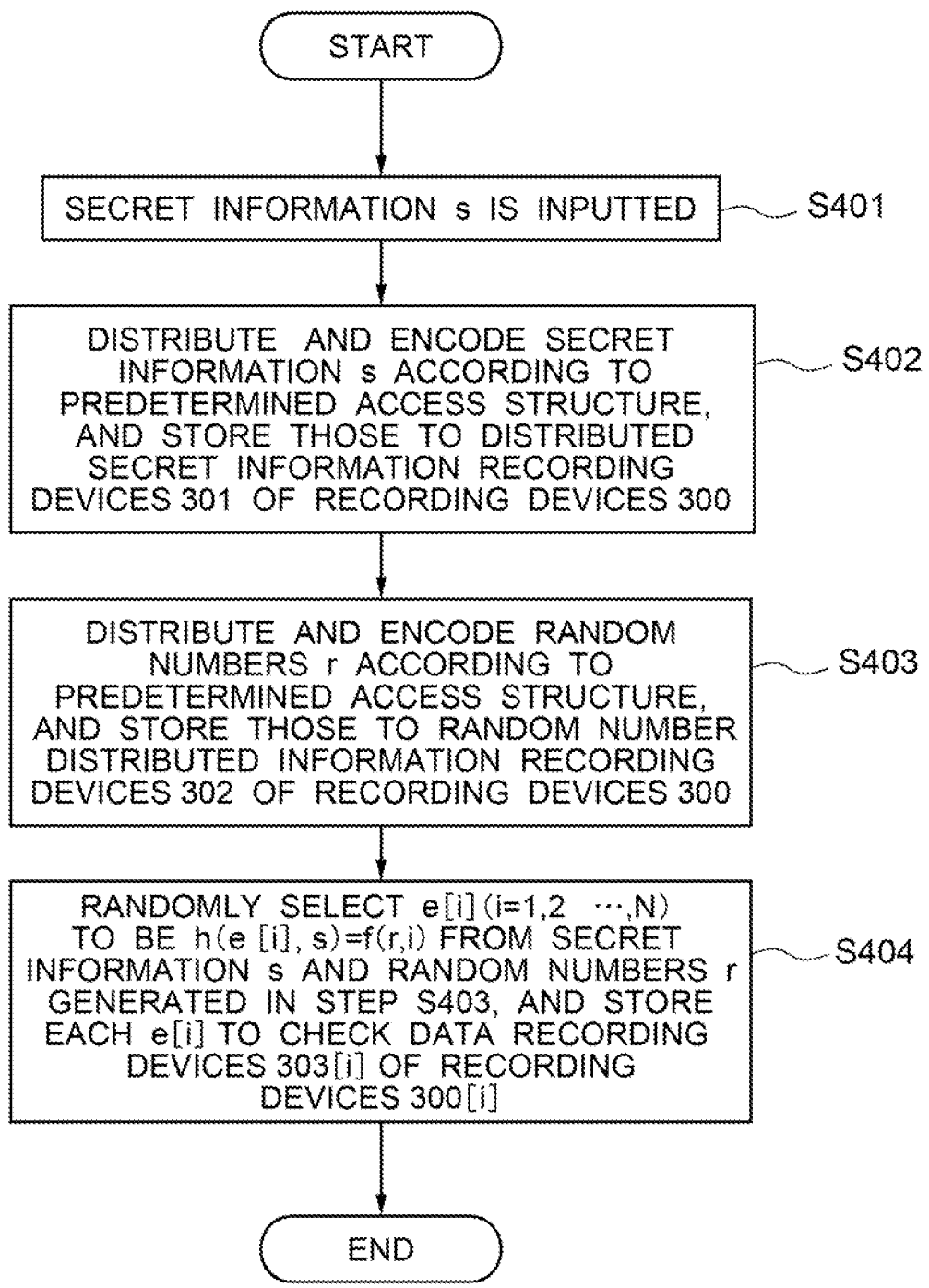
FIG. 3 is a flowchart showing actions of the distributed information generating device shown in FIG. 1.

FIG. 3 is a flowchart showing the actions of the distributed information generating device 100 of the secret information distribution system according to the exemplary embodiment. FIG. 4 is a flowchart showing the actions of the distributed information restoring device 200 of the secret information distribution system according to the exemplary embodiment.

As shown in FIG. 3, the secret information s as the base of the secret information data set S is inputted to the distributed information generating device 100 (step S401).

When the secret information s is inputted, the secret information distributing unit 101 of the distributed information generating device 100 distributes and encodes the secret information s according to the access structure "Γ" defined in advance, and stores those to the distributed secret information recording devices 301 of the recording devices 300 (step S402).

The random number information distributing unit 102 of the distributed information generating device 100 generates random numbers r, distributes and encodes the generated random numbers r according to the access structure "Γ" defined in advance, and stores those to the random number secret information recording devices 302 of the recording devices 300 (step S403).

The check data generating unit 103 of the distributed information generating device 100 randomly generates n-pieces of check data e[i] (i=1, 2, 3, ... n) satisfying h(e[i], s)=f(r, i) for the secret information s and the random numbers r generated in the step S403, and stores those to the check data recording devices 303 of the recording devices 300 (step S404).

Figure 4:
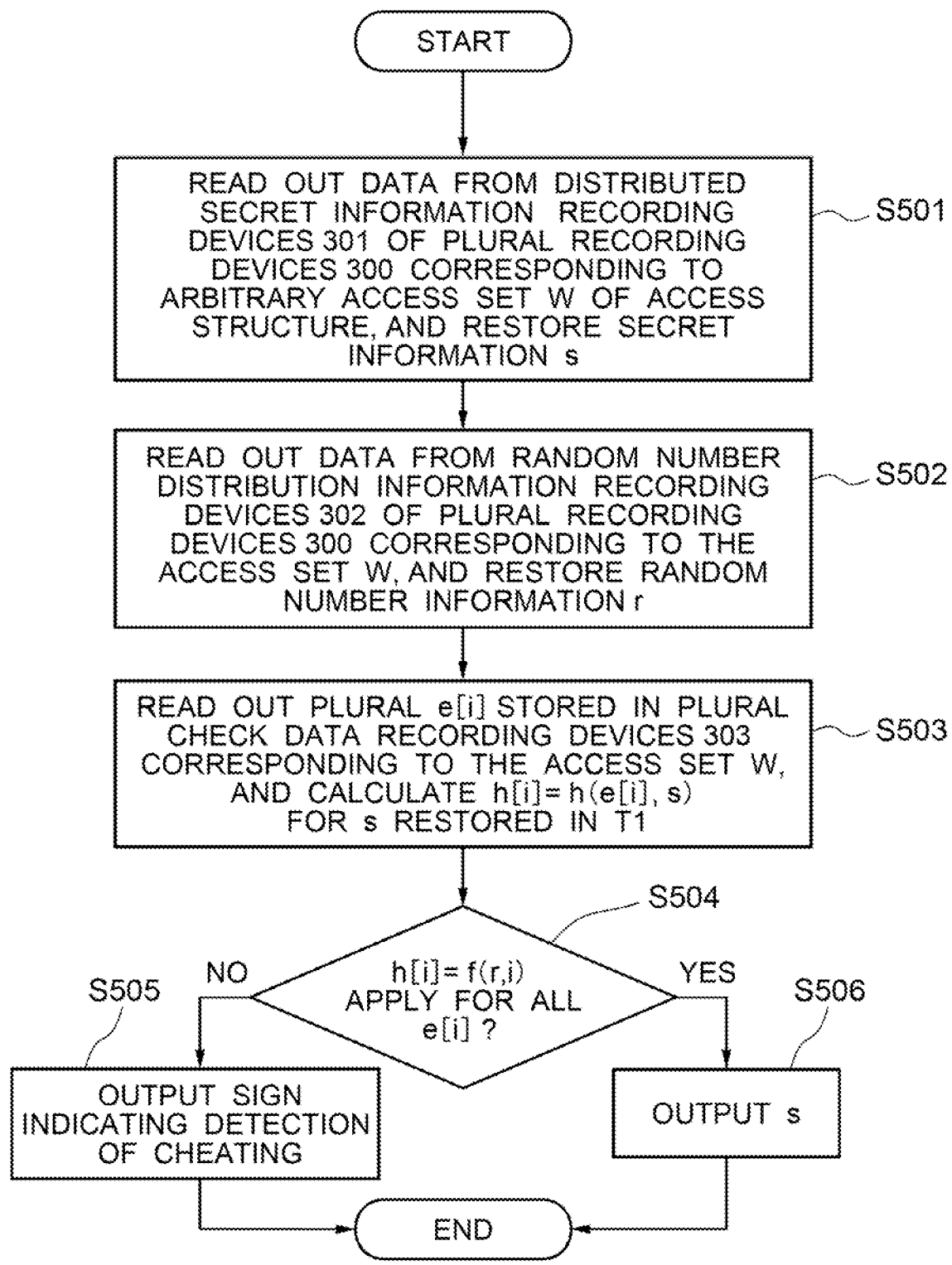
FIG. 4 is a flowchart showing actions of the distributed information restoring device shown in FIG. 2.

As shown in FIG. 4, the distributed information restoring device 200 sends a control signal indicating to read out the data of the distributed secret information recording devices 301 to the access control devices 304 of the recording devices 300 so as to input the data read out from the distributed secret information recording devices 301 of a plurality of recording devices 300 according to arbitrary access set W of the access structure "Γ". The secret information restoring unit 201 restores the secret information s as the base of the secret information data set S based on the inputted data (step S501).

Then, the distributed information restoring device 200 sends a control signal indicating to read out the data of the random number distribution information recording devices 302 to the access control devices 304 of the recording devices 300 so as to input the data read out from the random number distribution information recording devices 302 of a plurality of recording devices 300 corresponding to the access set W. The random number information restoring unit 202 restores the random number information r as the base of the random number information data set R based on the inputted data (step S502).

The step S501 and the step S502 described above may be executed simultaneously or may be executed in order of the step S502→the step S501.

At the point where the processing is completed in the steps S501 and S502 described above, the distributed information restoring device 200 sends a control signal indicating to read out the data of the check data recording devices 303 to the access control devices 304 of the recording devices 300 so as to input the check data.

The cheating detecting unit 203 calculates the hash function h(e[i], s)=f(r, i) for the secret information s as the base of the secret information data set S restored in the step S501, the random numbers r restored in the step S502, and the data e[i] read out from the check data recording devices 303 of the plurality of recording devices 300 corresponding to the access set W (step S503).

When the hash function h(e[i], s)=f(r, i) applies for the hash function h(e[i], s) calculated in the step S503 (step S504; YES), the cheating detecting unit 203 outputs the restored secret information s and ends the processing (step S506).

When the hash function h(e[i], s)=f(r, i) does not apply (step S504; NO), the cheating detecting unit 203 outputs a sign indicating a detection of cheating and ends the processing (step S505).

As described above, the exemplary embodiment is structured to: generate a sequence of random numbers corresponding to the number into which the secret information is distributed by randomly selecting all the coefficients of the polynomial; encode and distribute all the coefficients into two or more pieces of random number distribution information according to an access structure; generate a hash function whose hash values correspond to the random number sequence by taking the secret information and the random number distribution information as the input; and select the keys for which the hash function applies so as to individually set data for checking whether or not the restored secret information is being manipulated as number of pieces of check data corresponding to the number of pieces into which the secret information is distributed; read out the random number information when restoring; restore the random number sequence according to the access structure; read out the check data; and judge that the restored secret information is not being manipulated when the read out check data satisfies the hash function. Therefore, it is possible to detect whether or not the restored secret information is being manipulated.

Further, the exemplary embodiment checks whether or not cheating is detected by using the restored secret information. Therefore, it is possible to detect the cheating regardless of the method of the secret distribution to be used.

The misbehaving recording device 300[i] which has manipulated the partial information in the distributed information generating device 100 and the distributed information restoring device 200 according to the exemplary embodiment is required to first give the manipulated distributed secret information and the random number distribution information to the distributed information restoring device 200 according to the protocol. At this time, the misbehaving recording device cannot refer to the check data values stored in the proper recording devices that have not manipulated anything.

The check data e stored in the proper recording devices are individually and uniformly randomly selected. Further, the function h used for checking the unmanipulated property satisfies the relation shown in Expression 18 for all a and a'. Therefore, even if the misbehaving recording device refers to the distributed secret information and the random number distribution information stored in all the recording devices and can restore the secret information s and the random number information r, the probability for satisfying the h(e, s')=f(r, i) for the manipulated secret information s' and random number information r' becomes equal to or less than e. Thus, practically, such manipulation cannot be done.

Further, the check data and the method for checking the unmanipulated property according to the exemplary embodiment do not depend on the secret distribution method to be applied. Therefore, the exemplary embodiment also has a characteristic that it is applicable for arbitrary secret distribution methods.

Next, verified is a fact that it is possible to detect manipulation of the restored secret information by using $GF(p^N)$ (p:

prime number, GF: Galois Field) as the data set of the secret information s=(s[1], s[2], - - - , s[N]), using the base of GF (p^(k−1)) as the random number data r=(r[0], r[1], - - - , r[k−2]), and using GF(p)^2 as the check data e=(e[0], e[1].

In this case, it is supposed to use the expression based on the probability theory shown in Expression 15 instead of the hash values shown in Expression 14. Further, the secret information distribution method by using the (k, n) threshold scheme disclosed in Non-Patent Document 1 is applied.

In this exemplary embodiment, it is assumed that: the access structure of the secret distribution is a (k, n) threshold-value type access structure; the secret information distributing unit 101 and the random number information distributing unit 102 perform distribution and encoding by using the (k, n) threshold scheme depicted in Non-Patent Document 1; and the secret information restoring unit 201 and the random number information restoring unit 202 restore the secret information and the random number information by using a restoring method corresponding to the (k, n) threshold scheme.

Under the condition described above, the secret information s=(s[1], s[2], - - - , s[N])∈GF (p^N) (each s[i]∈GF (p)) is inputted to the distributed information generating device 100 according to the exemplary embodiment.

When the secret information s is inputted, the distributed information generating device 100 randomly generates a "k−1"-degree polynomial whose constant term on GF (p^N) is s by using the secret information distributing unit 101. This "k−1"-degree polynomial is expressed as fs(x).

The secret information distributing unit 101 calculates fs(1), fs(2), - - - , fs(n) for 1, 2, - - - , n different from each other, and stores the calculation results to the distributed secret information recording unit 301[1] of the recording device 300[1], the distributed secret information recording unit 301[2] of the recording device 300[2], - - - , and the distributed secret information recording unit 301[n] of the recording device 300[n], respectively.

The random number information distributing unit 102 generates the random numbers r as the base of GF(p^(k−1)), and generates a "k−1"-degree polynomial whose constant term on GF(p^(k−1)) is r. This "k−1"-degree polynomial is expressed as fr(x).

Then, the random number information distributing unit 102 calculates fr(1), fr(2), - - - , fr(n) for i[1], i[2], - - - , i[n], and stores the calculation results to the random number distribution information recording unit 302[1] of the recording device 300[1], the random number distribution information recording unit 302[2] of the recording device 300[2], - - - , and the random number distribution information recording unit 302[n] of the recording device 300[n], respectively.

The check data generating unit 103 randomly selects (e[i0], e[i1]) with which an expression h (e[i], s)=f(r, i) applies for i=1, 2, - - - , n from GF(p), and stores the acquired e[1]=(e[i0], e[i1]) (i=1, 2, - - - , n) to the check data recording unit 303[i] of the recording device 300[i]. Note, however, that h and f mentioned above are functions defined in Expression 20 and Expression 21, respectively.

$$h(e[i],s)=e[i0]+s[1]\times e[i1]+s[2]\times e[i1]^2+\ldots+s[N]\times e[i1]^N \quad \text{[Expression 20]}$$

$$f(r,i)=r[0]+r[1]\times i+r[2]\times i^2+\ldots+r[k-2]\times i^{k-2} \quad \text{[Expression 21]}$$

In the meantime, the distributed information restoring device 200 according to the exemplary embodiment first sends out a control signal for reading out the distributed secret information to the respective access control units 304 of the recording devices 300[1], 300[2], - - - , 300[k] from the readout control unit 204, and reads out the data from the respective distributed secret information recording units 301 of the recording devices 300[1], 300[2], - - - , 300[k]. These data are expressed as vs[i[1]], vs[i[2]], vs[i[k]].

The secret information restoring unit 201 generates gs(0) of a "k−1"-degree polynomial gs(x) on GF(p^N) that goes through coordinates (i[1], vs[i[1]]), (i[2], vs[i[2]]), - - - , (i[k], vs[i[k]]) by taking each of (i[1], vs[i[1]]), (i[2], vs[i[2]]), - - - , (i[k], vs[i[k]]) as the input. Specifically, the secret information restoring unit 201 calculates s'=gs(0) by a method that solves simultaneous equations, a method using Lagrangian interpolation, etc.

Then, the distributed information restoring device 200 sends out a control signal for reading out the random number distribution information to the respective access control units 304 of the recording devices 300[1], 300[2], - - - , 300[k] from the readout control unit 204, and reads out the data from the respective random number distribution information recording units 302 of the recording devices 300[1], 300[2], - - - , 300[k]. These data are expressed as vr[i[1]], vr[i[2]], - - - , vr[i[k]].

The random number information restoring unit 202 generates gr(0) of a "k−1"-degree polynomial gr(x) on GF'(p^[k−1]) that goes through coordinates (i[1], vr[i[1]]), (i[2], vr[i[2]]), - - - , (i[k], vr[i[k]]) by taking each of (i[1], vr[i[1]]), (i[2], vr[i[2]]), - - - , (i[k], vr[i[k]]) as the input. Specifically, the random number information restoring unit 202 calculates r'=gr(0) by a method that solves simultaneous equations, a method using Lagrangian interpolation, etc.

Then, the distributed information restoring device 200 sends out a control signal for reading out the check data to the respective access control units 304 of the recording devices 300[1], 300[2], - - - , 300[k] from the readout control unit 204, and reads out the data from the respective check data recording units 303 of the recording devices 300[1], 300[2], - - - , 300[k]. These data are expressed as e[i[1]], e[i[2]], - - - , e[i[k]]. Note that each can be expressed as e[i[j]]=(e[i[j]0], e[i[j]1]).

The cheating detecting unit 203 takes each of s', r', e[1], e[2], - - - , e[n] shown in Expression 22 as the input, and checks whether or not the condition of Expression 23 applies for j=1, 2, - - - , n. The cheating detecting unit 203 outputs s' as the secret information when the condition applies for all of e[j] (j=1, - - - , n), and outputs "⊥", for example, as a sign indicating that a cheating is detected when the condition does not apply.

$$s' = (s'[1], s'[2], \ldots, s'[N]) \qquad \text{[Expression 22]}$$
$$r' = (r'[0], r'[1], \ldots, r'[k-2])$$
$$e[i[1]] = (e[i[1]0], e[i[1]1])$$
$$e[i[2]] = (e[i[2]0], e[i[2]1])$$
$$\ldots$$
$$e[i[k]] = (e[i[k]0], e[i[k]1])$$

$$h(e[i]j, s') = f(r', i[j]) \qquad \text{[Expression 23]}$$

In the secret information distribution system according to the exemplary embodiment, the size of the secret information is p^N, the size of the distributed information is p^(N+k+1), and a cheating detection rate is (1−N/p). Assuming that the size of the secret information is s and the cheating detection rate is (1−ϵ), the size of the distributed information becomes almost s*((log s)/ϵ)^(k+1).

Based on this, considering Expression 15, it can be found that the cheating detection rate with the exemplary embodiment is extremely high, and the rate of succeeding in cheating is extremely small.

Next, verified is a fact that it is possible to detect manipulation of the restored secret information by using GF(p^N) (p: prime number, GF: Galois Field) as the data set of the secret information s=(s[1], s[2], - - -, s[N]), using the base of GF(p^(n−1)) as the random number data r=(r[0], r[1], - - -, r[n−2]), and using GF(p)^2 as the check data e=(e[0], e[1]).

In this case, it is supposed to use the expression based on the probability theory shown in Expression 15 instead of the hash values shown in Expression 14. Further, the secret information distribution method by using the (n, n) threshold scheme disclosed in Non-Patent Document 2 is applied.

In this exemplary embodiment, it is assumed that: the access structure of the secret distribution is a (n, n) threshold-value type access structure; the secret information distributing unit 101 and the random number information distributing unit 102 perform distribution and encoding by using the (n, n) threshold scheme depicted in Non-Patent Document 2; and the secret information restoring unit 201 and the random number information restoring unit 202 restore the secret information and the random number information by using a restoring method corresponding to the (n, n) threshold scheme.

Under the condition described above, the secret information s=(s[1], s[2], - - -, s[N])∈GF(p^N) (each s[i]∈GF(p)) is inputted to the distributed information generating device 100 according to the exemplary embodiment.

When the secret information s is inputted, the distributed information generating device 100 randomly selects the bases vs[1], vs[2], - - - , vs[n] on GF(p^N) to be vs[1]+vs[2]+ - - - +vs[n]=s by using the secret information distributing unit 101, and stores each of vs[i] (i=1, 2, - - -, n) to the distributed secret information recording units 301[1] to [n] of the recording device 300[i], respectively.

The random number information distributing unit 102 generates the random numbers r as the base of GF(p^(n−1)), randomly selects the bases vr[1], vr[2], - - -, vs[n] on GF(p^(n−1)) to be vr[1]+vr[2]+ - - - +vr[n]=s, and stores each of vr[i] (i=1, 2, - - - , n) to the random number distribution information recording units 302[1] to [n] of the recording device 300[i], respectively.

The check data generating unit 103 randomly selects (e[i0], e[i1]) with which applies an expression h(e[i], s)=f(r, i) for i=1, 2, - - -, n from GF(p), and stores the acquired (e[i0], e[i1]) (i=1, 2, - - -, n) to the check data recording unit 303[1] to [n] of the recording device 300[i], respectively. Note, however, that h and f mentioned above are functions defined in Expression 24 and Expression 25, respectively.

$$h(e[i],s)=e[i0]+s[1]\times e[i1]+s[2]\times e[i1]^2+\ldots+s[N]\times e[i1]^N \quad \text{[Expression 24]}$$

$$f(r,i)=r[0]+r[1]\times i+r[2]\times i^2+\ldots+r[n-2]\times i^{n-2} \quad \text{[Expression 25]}$$

In the meantime, the distributed information restoring device 200 according to the exemplary embodiment first sends out a control signal for reading out the distributed secret information to the respective access control units 304 of the recording devices 300[1], 300[2], - - -, 300[n] from the readout control unit 204, and reads out the data from the respective distributed secret information recording units 301 of the recording devices 300[1], 300[2], - - -, 300[n]. These data are expressed as vs[1], vs[2], - - -, vs[n]. The secret information restoring unit 201 calculates s' by an arithmetic operation shown in Expression 26 by taking vs[1], vs[2], - - -, vs[n] as the input.

$$s'=vs[1]+vs[2]+\ldots+vs[n] \quad \text{[Expression 26]}$$

Then, the distributed information restoring device 200 sends out a control signal for reading out the random number distribution information to the respective access control units 304 of the recording devices 300[1], 300[2], - - -, 300[n] from the readout control unit 204, and reads out the data from the respective random number distribution information recording units 302 of the recording devices 300[1], 300[2], - - -, 300[n]. These data are expressed as vr[1], vr[2], - - -, vr[n].

The random number information restoring unit 202 calculates the coordinate r' by an arithmetic operation shown in Expression 27 by taking vr[1], vr[2], - - -, vr[n] as the input.

$$r'=vr[1]+vr[2]+\ldots+vr[n] \quad \text{[Expression 27]}$$

Thereafter, the distributed information restoring device 200 sends out a control signal for reading out the check data to the respective access control units 304 of the recording devices 300[1], 300[2], - - -, 300[n] from the readout control unit 204, and reads out the data from the respective check data recording units 303 of the recording devices 300[1], 300[2], - - -, 300[n]. These data are expressed as e[1], e[2], e[n]. Note that each can be expressed as e[i]=(e[i0], e[i1]).

The cheating detecting unit 203 takes each of s', r', e[1], e[2], - - -, e[n] shown in Expression 28 as the input, and checks whether or not the condition of Expression 29 applies for j=1, 2, - - -, n. The cheating detecting unit 203 outputs s' as the secret information when the condition applies for all of e[j] (j=1, - - -, n), and outputs "⊥", for example, as a sign indicating that a cheating is detected when the condition does not apply.

$$s' = (s'[1], s'[2], \ldots, s'[N]) \quad \text{[Expression 28]}$$
$$r' = (r'[0], r'[1], \ldots, r'[n-2])$$
$$e[1] = (e[10], e[11])$$
$$e[2] = (e[20], e[20])$$
$$\ldots$$
$$e[n] = (e[n0], e[n1])$$

$$h(e[j], s) = f(r, j) \quad \text{[Expression 29]}$$

In the secret information distribution system according to the exemplary embodiment, the size of the secret information is p^N, the size of the distributed information is p^(N+n+1), and a cheating detection rate is (1−N/p). Assuming that the size of the secret information is s and the cheating detection rate is (1−ε), the size of the distributed information becomes almost s*((log s)/ε)^(k+1).

Based on this, considering Expression 15, it can be found that the cheating detection rate with the exemplary embodiment is extremely high, and the rate of succeeding in doing cheating is extremely small.

While the present invention has been described heretofore by referring to the specific embodiments illustrated in the drawings, the present invention is not limited only to the embodiments shown in the drawings. Any known structures can be employed therewith, as long as the effects of the present invention can be achieved.

This Application claims the Priority right based on Japanese Patent Application No. 2009-146653 filed on Jun. 19, 2009 and the disclosure thereof is hereby incorporated by reference in its entirety.

INDUSTRIAL APPLICABILITY

The present invention can provide an optimum system for managing secret information in a distributed manner, which can detect whether or not restored information is manipulated with an extremely high probability when keeping secret information by distributing it into two or more pieces of secret distributed information.

REFERENCE NUMERALS

100 Distributed information generating device
101 Secret information distributing unit
102 Random number information distributing unit
103 Check data generating unit
200 Distributed information restoring device
201 Secret information restoring unit
202 Random number information restoring unit
203 Cheating detecting unit
204 Readout control unit
300 Recording device
301 Distributed secret information recording unit
302 Random number distribution information recording unit
303 Check data recording unit
304 Access control unit

The invention claimed is:

1. A secret information distribution system which manages secret information by distributing the secret information into two or more pieces of distributed information and restores the secret information by integrating the distributed information, the system comprising
a distributed information generating device, a recording device, and a distributed information restoring device, wherein:
the distributed information generating device comprises
a secret information distributing unit which encodes and distributes secret information into two or more pieces of distributed information according to an access structure,
a random number information distributing unit which generates a sequence of random numbers corresponding to a number of pieces into which the secret information is distributed by randomly selecting all coefficients of a polynomial, and encodes and distributes all the coefficients into two or more pieces of random number distribution information according to the access structure, and
a check data generating unit which generates a hash function whose hash values correspond to the random number sequence by taking the secret information and the random number distribution information as input, and selects keys for which the hash function applies so as to individually set data for checking whether or not restored secret information is being manipulated as a number of pieces of check data corresponding to the number of pieces into which the secret information is distributed,
the distributed information generating device outputs the distributed information, the random number information, and the check data as a set of information;
a number of the recording devices corresponding to the number of pieces into which the secret information is distributed are provided, and each of the recording devices records the distributed information, the random number information, and the check data as a set of information; and
the distributed information restoring device comprises
a secret information restoring unit which reads out the distributed information from the recording devices, and restores the secret information according to the access structure,
a random number information restoring unit which reads out the random number information from the recording devices, and restores the random number sequence according to the access structure, and
a cheating detecting unit which reads out the check data from the recording devices, and judges that the restored secret information is not being manipulated when the read out check data satisfies the hash function.

2. The secret information distribution system as claimed in claim 1, wherein
when the random number sequence is a function $f(r, i)=r[0]+r[1] \times i+r[2] \times i^2+ \cdots +r[k-1] \times i^{k-1}$, where $r[0]$, $r[1]$, $r[2]$, $\cdots r[k-1]$ are coefficients of the polynomial and $i=1$ to $n$ ($n$ is number corresponding to the number of pieces into which the secret information is distributed), the hash function h is a function satisfying $h((e[0], e[1]), s)=f(r, i)$.

3. The secret information distribution system as claimed in claim 1, wherein
the access structure is an access structure of a $(k, n)$ threshold scheme.

4. The secret information distribution system as claimed in claim 1, wherein
the access structure is an access structure of a $(n, n)$ threshold scheme.

5. A distributed information generating device used in a secret information distribution system which manages secret information by distributing the secret information into two or more pieces of distributed information and restores the secret information by integrating the distributed information, the distributed information generating device comprising
a secret information distributing unit which encodes and distributes secret information into two or more pieces of distributed information according to an access structure,
a random number information distributing unit which generates a sequence of random numbers corresponding to a number of pieces into which the secret information is distributed by randomly selecting all coefficients of a polynomial, and encodes and distributes all the coefficients into two or more pieces of random number distribution information according to the access structure, and
a check data generating unit which generates a hash function whose hash values correspond to the random number sequence by taking the secret information and the random number distribution information as input, and selects keys for which the hash function applies so as to individually set data for checking whether or not restored secret information is being manipulated as a number of pieces of check data corresponding to the number of pieces into which the secret information is distributed, wherein
the distributed information generating device outputs the distributed information, the random number information, and the check data as a set of information.

6. A distributed information restoring device used in a secret information distribution system which manages secret information by distributing the secret information into two or more pieces of distributed information and restores the secret information by integrating the distributed information, the distributed information restoring device being designed to input, as a set of information, distributed information acquired by encoding and distributing secret information according to an access structure, random number information acquired by generating a sequence of random numbers corresponding to a number of pieces into which the secret information is distributed by randomly selecting all coefficients of a polynomial and encoding and distributing all the coefficients according to the access structure, and check data set individually as a number of pieces of check data corresponding to the number of pieces into which the secret information is distributed by generating a hash function whose hash values correspond to the random number sequence and selecting keys for which the hash function applies, which is a set of information outputted by a distributed information generating device of the secret information distribution system, wherein the distributed information restoring device comprises a secret information restoring unit which acquires the distributed information, and restores the secret information according to the access structure, a random number information restoring unit which reads out the random number information, and restores the random number sequence according to the access structure, and a cheating detecting unit which reads out the check data, and judges that the restored secret information is not being manipulated when the read out check data satisfies the hash function.

7. A secret information distribution method which manages secret information by distributing the secret information into two or more pieces of distributed information and restores the secret information by integrating the distributed information, the method comprising:

encoding and distributing secret information into two or more pieces of distributed information according to an access structure;

generating a sequence of random numbers corresponding to a number of pieces into which the secret information is distributed by randomly selecting all coefficients of a polynomial, and encoding and distributing all the coefficients into two or more pieces of random number distribution information according to the access structure;

generating a hash function whose hash values correspond to the random number sequence by taking the secret information and the random number distribution information as input, and selecting keys for which the hash function applies so as to individually set data for checking whether or not restored secret information is being manipulated as a number of pieces of check data corresponding to the number of pieces into which the secret information is distributed;

outputting the distributed information, the random number information, and the check data as a set of information;

reading out the distributed information, and restoring the secret information according to the access structure;

reading out the random number information, and restoring the random number sequence according to the access structure; and reading out the check data, and judging that the restored secret information is not being manipulated when the read out check data satisfies the hash function.

8. The secret information distribution method as claimed in claim 7, wherein when the random sequence is a function $f(r, i)=r[0]+r[1]\times i+r[2]\times i^2+ \cdots +r[k-1]\times i^{k-1}$, where $r[0], r[1], r[2], \cdots r[k-1]$ are coefficients of the polynomial and $i=1$ to n (n is number corresponding to the number of pieces into which the secret information is distributed), the hash function h is a function satisfying $h((e[0], e[1]), s)=f(r, i)$.

9. A non-transitory computer readable recording medium storing a secret information distribution program for controlling generation of distributed information in a secret information distribution system which manages secret information by distributing the secret information into two or more pieces of distributed information and restores the secret information by integrating the distributed information, the program causing a computer to execute:

a function of encoding and distributing secret information into two or more pieces of distributed information according to an access structure;

a function of generating a sequence of random numbers corresponding to a number of pieces into which the secret information is distributed by randomly selecting all coefficients of a polynomial, and encoding and distributing all the coefficients into two or more pieces of random number distribution information according to the access structure; and a function of generating a hash function whose hash values correspond to the random number sequence by taking the secret information and the random number distribution information as input, and selecting keys for which the hash function applies so as to individually set data for checking whether or not restored secret information is being manipulated as a number of pieces of check data corresponding to the number of pieces into which the secret information is distributed.

10. A non-transitory computer readable recording medium storing a program for controlling restoration of secret information used in a secret information distribution system which manages secret information by distributing the secret information into two or more pieces of distributed information and restores the secret information by integrating the distributed information, the program causing a computer to execute: by taking distributed information acquired by encoding and distributing secret information according to an access structure, random number information acquired by generating a sequence of random numbers corresponding to a number of pieces into which the secret information is distributed by randomly selecting all of coefficients of a polynomial and encoding and distributing all the coefficients according to the access structure, and check data set individually as a number of pieces of check data corresponding to the number of pieces into which the secret information is distributed by generating a hash function whose hash values correspond to the random number sequence and selecting keys for which the hash function applies, as a set of information outputted by a distributed information generating device of the secret information distribution system, a function of acquiring the distributed information and restoring the secret information according to the access structure;

a function of reading out the random number information, and restoring the random number sequence according to the access structure; and a function of reading out the check data, and judging that the restored secret information is not being manipulated when the read out check data satisfies the hash function.

11. A secret information distribution system which manages secret information by distributing the secret information into two or more pieces of distributed information and restores the secret information by integrating the distributed information, the system comprising a distributed information generating device, a recording device, and a distributed information restoring device, wherein:

the distributed information generating device comprises secret information distributing means for encoding and distributing secret information into two or more pieces of distributed information according to an access structure, random number information distributing means for generating a sequence of random numbers corresponding to a number of pieces into which the secret information is distributed by randomly selecting all coefficients of a polynomial, and encoding and distributing all the coefficients into two or more pieces of random number distribution information according to the access structure, and check data generating means for generating a hash function whose hash values correspond to the random number sequence by taking the secret information and the random number distribution information as input, and selecting keys for which the hash function applies so as to individually set data for checking whether or not restored secret information is being manipulated as a number of pieces of check data corresponding to the number of pieces into which the secret information is distributed, the distributed information generating device outputs the distributed information, the random number information, and the check data as a set of information;

a number of the recording devices corresponding to the number of pieces into which the secret information is distributed are provided, and each of the recording devices records the distributed information, the random number information, and the check data as a set of information; and the distributed information restoring device comprises secret information restoring means for reading out the distributed information from the recording devices, and restoring the secret information according to the access structure, random number information restoring means for reading out the random number information from the recording devices, and restoring the random number sequence according to the access structure, and cheating detecting means for reading out the check data from the recording devices, and judging that the restored secret information is not being manipulated when the read out check data satisfies the hash function.

12. A distributed information generating device used in a secret information distribution system which manages secret information by distributing the secret information into two or more pieces of distributed information and restores the secret information by integrating the distributed information, the distributed information generating device comprising secret information distributing means for encoding and distributing secret information into two or more pieces of distributed information according to an access structure, random number information distributing means for generating a sequence of random numbers corresponding to a number of pieces into which the secret information is distributed by randomly selecting all coefficients of a polynomial, and encoding and distributing all the coefficients into two or more pieces of random number distribution information according to the access structure, and check data generating means for generating a hash function whose hash values correspond to the random number sequence by taking the secret information and the random number distribution information as input, and selecting keys for which the hash function applies so as to individually set data for checking whether or not restored secret information is being manipulated as a number of pieces of check data corresponding to the number of pieces into which the secret information is distributed, wherein the distributed information generating device outputs the distributed information, the random number information, and the check data as a set of information.

13. A distributed information restoring device used in a secret information distribution system which manages secret information by distributing the secret information into two or more pieces of distributed information and restores the secret information by integrating the distributed information, the distributed information restoring device being designed to input, as a set of information, distributed information acquired by encoding and distributing secret information according to an access structure, random number information acquired by generating a sequence of random numbers corresponding to a number of pieces into which the secret information is distributed by randomly selecting all of coefficients of a polynomial and encoding and distributing all the coefficients according to the access structure, and check data set individually as a number of pieces of check data corresponding to the number of pieces into which the secret information is distributed by generating a hash function whose hash values correspond to the random number sequence and selecting keys for which the hash function applies, which is a set of information outputted by a distributed information generating device of the secret information distribution system, wherein the distributed information restoring device comprises secret information restoring means for acquiring the distributed information, and restoring the secret information according to the access structure, random number information restoring means for reading out the random number information, and restoring the random number sequence according to the access structure, and cheating detecting means for reading out the check data, and judging that the restored secret information is not being manipulated when the read out check data satisfies the hash function.

* * * * *